Feb. 12, 1963  I. PEYCHES ETAL  3,077,092
MANUFACTURE OF FIBERS, PARTICULARLY GLASS FIBERS
Filed June 26, 1957
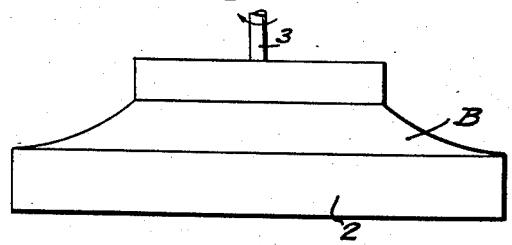
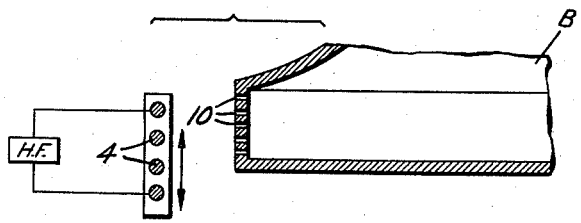
INVENTORS
IVAN PEYCHES
MARCEL LEVECQUE
BY
ATTORNEY

United States Patent Office 3,077,092
Patented Feb. 12, 1963

3,077,092
MANUFACTURE OF FIBERS, PARTICULARLY GLASS FIBERS
Ivan Peyches, Paris, and Marcel Levecque, Saint Gratien, France, assignors to Compagnie de Saint-Gobain, a corporation of France
Filed June 26, 1957, Ser. No. 668,227
Claims priority, application France July 2, 1956
7 Claims. (Cl. 65—6)

The present invention relates to the manufacture of fibers from thermoplastic materials, particularly glass fibers, in which the material in melted state, contained in a hollow revolving body supplied with orifices at its periphery, is projected through these orifices under the action of centrifugal force. To put the apparatus and process in accordance with the invention in operation, the revolving body or centrifuge may have one or several rows of orifices in its peripheral wall.

It is the object of the invention to regulate the temperature of the peripheral part of the rotating body or centrifuge by imposing on that peripheral part or wall heating or cooling effects which are designed to impart thereto a temperature independent of those existing in the interior of the centrifuge, namely, either the temperature of the glass supply or that of the combustion gases, as well as that of the ambient temperature of the surrounding air.

The improvement according to the invention allows precise and flexible regulation at every instant of the temperature of the peripheral wall of the rotating body at a predetermined value.

In the usual case of production of fibers by centrifuging, where the peripheral part or wall of the rotating body is metallic, the conducting properties of metal are utilized in order to develop in the wall, through direct passage of an electric current or preferably by induction, a Joule effect producing caloric energy to correct or modify the temperature of the peripheral wall.

Because of the rapid rotation of the rotating body, it is not necessary to place the heating or cooling devices in an enveloping or symmetrical manner with respect thereto. It is sufficient for the temperature modifying device to act on one region or a localized point of the peripheral wall, to have all its points subjected to its action, on account of the rapid rotation of the centrifuge.

The heating methods utilized permit the attainment of a uniform heating over the whole height of the peripheral wall containing the orifices, with a view of obtaining identical conditions for the glass being thrown through all the projection orifices, particularly in the case of peripheral walls of great height presenting numerous rows of orifices.

The heating methods can likewise be arranged to permit different heating effects on the different rows of orifices of the peripheral wall, which particularly permits the compensating of local temperature differences resulting from different conditions of supply of the melted glass or hot gases, or the possible directing of flames on the outside of the rotating body, thereby to bring the whole external surface of the peripheral wall to a substantially constant temperature.

The invention allows regulation of the temperature of the peripheral wall to bring it either to a temperature higher than that of the glass supply or to the same temperature, or even to a temperature lower than that of the glass. In the first case production of fibers is assured without the glass being raised to a high temperature, which is advantageous for the quality of fibers obtained. In particular, the peripheral wall can be heated, according to the invention, to the desired temperature so that it forms at its glass-contacting surface a thin film whose temperature is above that of the mass of glass and which acts as lubricant for the passage of the glass through each orifice without appreciably changing the temperature of the central region of each fiber.

The attainment of a homogeneous temperature over the entire peripheral wall which can, as has been stated above, be obtained according to the invention, is of particular advantage. It leads to obtaining fibers of much more uniform diameter through the different orifices of the peripheral wall. Besides, if one part of the wall is at a lower temperature than that of other areas of this wall, the glass may become devitrified in this area and stop up the orifices thereat. The other orifices which continue to discharge, wear out rapidly and the peripheral wall of the centrifuge may thus also be put out of working order.

According to the preferred method of operation where suitable apparatus is utilized to develop induced currents in the metal of the peripheral wall, these currents can be obtained neatly by means of high frequency fields. These high frequency fields can be obtained by means of induction coils placed in proximity to the centrifuge, in particular by means of one or several annular induction coils surrounding the centrifuge or by one or more arcuate coils arranged along arcs concentric with the axis of rotation thereof. This preferred method can be carried into practice with particularly advantageous results which will be described hereafter.

In every case, the invention provides for the regulation of the position of the heating apparatus itself relative to the peripheral wall of the centrifuge to effect the heating of the wall, or the heating of the wall itself.

The attached drawing shows schematically and by way of example, a preferred embodiment of the invention, wherein:

FIG. 1 is a front elevation of a rotary centrifuge having a peripheral wall provided with orifices through which fibers of thermoplastic material are projected; and FIG. 2 is a sectional view of a portion of the centrifuge and a heating arrangement therefor for heating the peripheral wall by induced currents.

As shown in the drawing, the centrifuge body B is rotated at high speed to discharge threads or filaments of molten thermoplastic material through the openings 10 in the peripheral wall thereof. The invention seeks to control accurately the temperature of the metallic wall 2 through which the filaments are projected.

The advantages of the invention may be attained whether the peripheral wall 2 of the centrifuge B is provided with a single row of orifices 10 or whether there are provided therein a plurality of superposed rows of orifices ranging from 2 to 30 rows, as known in the art.

In the preferred embodiment illustrated in the drawing, the device carries an annular coil 4 placed concentrically to the rotating body. This coil, fed by high frequency currents, from electrical energy source H.F., induces, in peripheral wall 2 of the rotating body, high frequency currents which have the effect of heating said wall. Of course, the coil 4 may be in the form of a complete annulus, in the form of an arc constituting a partial annulus or may be formed of a plurality of the latter spaced from each other.

The frequency of the currents feeding coil 4 from source H.F. can be regulated either for developing homogeneous heating in the entire thickness of the wall, or for obtaining, through a skin effect, an area hotter on the exterior part of the latter.

Heating of the wall can be uniform over the whole height if the windings of the coil are all at the same distance from the wall, and if the coil, at the same height as the wall, is at the same level as the latter.

Different heating effects over the height of the wall may be obtained also by differences in setting of the coil with respect to the rotating body in the direction of the height, as indicated by the arrows, or by utilizing a coil whose windings have variable spacings with respect to the wall. The heating can also be changed if the wall is of a conic form.

The frequency used may be of the order of 100 to 500 kilocycles, for example.

We claim:

1. The method of manufacturing fine glass fibers from heated viscous vitreous material, which comprises projecting the heated viscous material by centrifugal force from a plurality of superposed rows of orifices provided in the peripheral wall of a rapidly rotating centrifuge to transform the material into fine filamentary fibers, and directly and restrictedly heating said wall inductively at an adjustable level for controlling the temperature of the peripheral wall differentially along its height independently of the temperature conditions within and outside the centrifuge to modify the character of the fibers issuing therefrom and to compensate for variations in the fibers occasioned by their issuance from different rows of orifices.

2. The method of manufacturing fine glass fibers from heated viscous vitreous material, which comprises projecting the heated viscous material by centrifugal force from orifices provided in the peripheral wall of a rapidly roating body to transform the material into fine filamentary fibers, and directly heating the peripheral wall inductively independently of the temperature conditions within and outside the rotating body to modify the character of the fibers issuing therefrom.

3. An apparatus for manufacturing glass fibers of thermoplastic material comprising a hollow rotary centrifuge adapted to receive the heated thermoplastic material in the interior thereof, said centrifuge having a peripheral wall provided with a plurality of orifices therein for projecting the fibers therethrough by centrifugal force, and inductive heating means distinct and spaced from said wall with at least part of said heating means at the level of said wall for directly imposing finely controllable temperature effects on said peripheral wall to control the character of the fibers projected from the centrifuge, said temperature effects being independent of the temperatures in the interior of the centrifuge and of the surrounding atmosphere.

4. An apparatus as set forth in claim 3 wherein the plurality of orifices in the peripheral wall are arranged in a plurality of superposed rows and the inductive heating means is disposed relative to said peripheral wall to heat said wall differentially along the height thereof.

5. An apparatus as set forth in claim 4 wherein said heating means comprises an electrical induction coil surrounding said centrifuge, the elevation of which is adjustable relative to the peripheral wall to affect differentially the inductive heating effects transmitted to the several superposed rows of orifices.

6. An apparatus as set forth in claim 3, including a source of electrical energy of high frequency on the order of 100 to 500 kilocycles connected to said inductive heating means.

7. An apparatus as set forth in claim 6 wherein the electrical energy is adjustable to control the depth of heating of the peripheral wall.

References Cited in the file of this patent

UNITED STATES PATENTS

| | | |
|---|---|---|
| 2,431,205 | Slayter | Nov. 18, 1947 |
| 2,525,970 | Spier et al. | Oct. 17, 1950 |
| 2,535,888 | Billman | Dec. 26, 1950 |
| 2,565,941 | Barnard | Aug. 28, 1951 |
| 2,609,566 | Slayter et al. | Sept. 9, 1952 |
| 2,624,912 | Heymes et al. | Jan. 13, 1953 |
| 2,816,826 | Brennan | Dec. 17, 1957 |
| 2,936,480 | Kleist | May 17, 1960 |

FOREIGN PATENTS

| | | |
|---|---|---|
| 575,210 | Great Britain | Feb. 7, 1946 |
| 1,124,487 | France | July 2, 1956 |
| 202,877 | Australia | July 5, 1956 |